US011194876B2

(12) United States Patent
Anders et al.

(10) Patent No.: US 11,194,876 B2
(45) Date of Patent: Dec. 7, 2021

(54) ASSISTING USERS TO INTERACT WITH MESSAGE THREADS ON SOCIAL MEDIA

(71) Applicant: International Business Machines Corporation, Armonk, NY (US)

(72) Inventors: Kelley Anders, East New Market, MD (US); Jonathan Dunne, Dungarvan (IE); Jeremy R. Fox, Georgetown, TX (US); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 16/250,499

(22) Filed: Jan. 17, 2019

(65) Prior Publication Data

US 2020/0233915 A1     Jul. 23, 2020

(51) Int. Cl.
  *G06F 16/95*     (2019.01)
  *G06F 16/9536*  (2019.01)
  *G06F 16/31*     (2019.01)
  *G06F 16/906*   (2019.01)
  *G06F 16/34*     (2019.01)

(52) U.S. Cl.
  CPC ........ *G06F 16/9536* (2019.01); *G06F 16/313* (2019.01); *G06F 16/345* (2019.01); *G06F 16/906* (2019.01)

(58) Field of Classification Search
  CPC ............................ G06Q 50/01; G06F 16/9535
  See application file for complete search history.

(56) References Cited

U.S. PATENT DOCUMENTS

2012/0028606 A1*  2/2012  Bobotek ................. H04L 51/28
                                                              455/411
2012/0136866 A1    5/2012  Carter et al.
(Continued)

FOREIGN PATENT DOCUMENTS

WO     WO2015006797 A1    1/2015

OTHER PUBLICATIONS

"Principal component analysis", WIKIPEDIA, https://en.wikipedia.org/wiki/Principal_component_analysis, last printed 11/15/218, 19 pages.
(Continued)

*Primary Examiner* — Mohammad S Rostami
(74) *Attorney, Agent, or Firm* — Scully, Scott, Murphy & Presser, PC; Michael O'Keefe, Esq.

(57) ABSTRACT

A method, system and computer program storage device to assist users interacting with message threads on social media. In an embodiment, the method comprises monitoring a message thread comprised of messages among a group of users on a social media platform for content that is inflammatory to one of the users; and when the inflammatory content has a defined condition, preventing the one of the users from posting messages to the message thread for a specified length of time. In an embodiment the defined condition is a defined level of the inflammatory content in the thread. In an embodiment, the defined condition is a defined increasing trend of the inflammatory content in the thread. In an embodiment, the monitoring the thread includes categorizing potentially inflammatory content into a plurality of categories, and specifying an inflammatory content level for each of the categories.

17 Claims, 4 Drawing Sheets

(56) References Cited

U.S. PATENT DOCUMENTS

| | | | | |
|---|---|---|---|---|
| 2012/0297477 | A1* | 11/2012 | Raviv | G06F 21/316 |
| | | | | 726/22 |
| 2015/0249584 | A1* | 9/2015 | Cherifi | G09B 5/00 |
| | | | | 709/224 |
| 2015/0256569 | A1* | 9/2015 | Sathish | G06F 16/288 |
| | | | | 709/204 |
| 2015/0302097 | A1* | 10/2015 | Focacci | G06F 16/35 |
| | | | | 707/723 |
| 2016/0253679 | A1* | 9/2016 | Venkatraman | G06Q 30/0185 |
| | | | | 705/310 |
| 2016/0337293 | A1* | 11/2016 | Koum | H04L 67/306 |
| 2017/0061516 | A1* | 3/2017 | Balasubramanian | ......... |
| | | | | G06F 16/24578 |
| 2017/0084149 | A1* | 3/2017 | Spikes | G08B 21/0288 |
| 2017/0374072 | A1 | 12/2017 | Steinberg et al. | |
| 2018/0089572 | A1* | 3/2018 | Aili | G06F 8/41 |
| 2018/0324126 | A1 | 11/2018 | Grant et al. | |
| 2018/0365552 | A1* | 12/2018 | Bostick | G06N 5/022 |
| 2019/0036960 | A1* | 1/2019 | Cullison | H04L 63/1416 |
| 2019/0052724 | A1* | 2/2019 | Dancel | H04L 63/107 |
| 2019/0124109 | A1* | 4/2019 | Foster | G06F 40/174 |
| 2020/0059375 | A1* | 2/2020 | Hewitt | G06F 40/30 |
| 2020/0082017 | A1* | 3/2020 | Vann | G06F 40/279 |
| 2020/0125639 | A1* | 4/2020 | Doyle | G10L 15/197 |
| 2020/0125928 | A1* | 4/2020 | Doyle | G06K 9/6256 |
| 2020/0126533 | A1* | 4/2020 | Doyle | G10L 15/1815 |

OTHER PUBLICATIONS

"Latent class model", WIKIPEDIA, https://en.wikipedia.org/wiki/Latent_class_model, last printed Oct. 25, 2018, 3 pages.

* cited by examiner

USER A: "WHO IS OUR STATE SENATOR?"

USER B: "OUR STATE SENATOR IS MS. X."

USER C: COMMENT ABOUT MS. X.

USER A: "WHO WON THE GAME YESTERDAY?'

USER B: "TEAM Y."

USER C: COMMENT ABOUT TEAM Y.

| APPLICATION | CHANNEL TOPIC | TOXICITY LEVEL SCALE (1 - 10) | THREAD TRENDING | CHANNEL TOXICITY FREEZE PERIOD | PULSE & RESPONSE |
|---|---|---|---|---|---|
| ☐ | POLITICS | 5 | UP ⇧ | 2 HOURS | TOXICITY RISING |
| ☐ | ENTERTAINMENT | 5 | DOWN ⇨ | NONE | TRENDING DOWN |
| ☐ | RELIGION | 9 | UP ⇧ | 24 HOURS | FREEZE REQUIRED |
| ☐ | MUSIC | 2 | NEUTRAL ⇨ | NONE | CALM |

FIG. 5

ASSISTING USERS TO INTERACT WITH MESSAGE THREADS ON SOCIAL MEDIA

BACKGROUND

This invention generally relates to social media and digital communications between parties and users. More specifically, embodiments of the invention analyze and, under certain circumstances, temporarily prevent a user from responding to messages in social media discussions.

As social websites and applications proliferate, social media platforms are becoming an integral part of modern society. Social media platforms refer to a web-based collective of online communication channels dedicated to community-based input, interaction, content sharing, and collaboration. Social media platforms are websites and applications that generally fall into one or more categories comprising forums, microblogs, social networks, social bookmarks, social curation and wikis.

Online conversations, forums, blogs, and other outlets can become quickly and easily overheated with inflammatory comments on any particular given topic within the digital realm.

SUMMARY

Embodiments of the invention provide a method, system and computer readable program product for assisting users to interact with message threads on social media. In an embodiment, the method comprises monitoring a message thread comprised of messages among a group of users on a social media platform for content that is inflammatory to one of the users; and when the inflammatory content has a defined condition, preventing the one of the users from posting messages to the message thread for a specified length of time. In an embodiment the defined condition is a defined level of the inflammatory content in the thread. In an embodiment, the defined condition is a defined increasing trend of the inflammatory content in the thread. In an embodiment, the monitoring the thread includes categorizing potentially inflammatory content into a plurality of categories, and specifying an inflammatory content level for each of the categories.

Embodiments of the invention address the social media space and digital communications between various parties and users. In embodiments, the invention monitors social media forums and allows the system to enable a thread to disappear for a variable differential length of time (so that the participants can take time and think about their response or post). The thread will show itself to a user when that user is likely more objective and ready to post after thought and consideration, since the original contents of the thread may have been inflammatory to the user.

DETAILED DESCRIPTION

Figure 1:
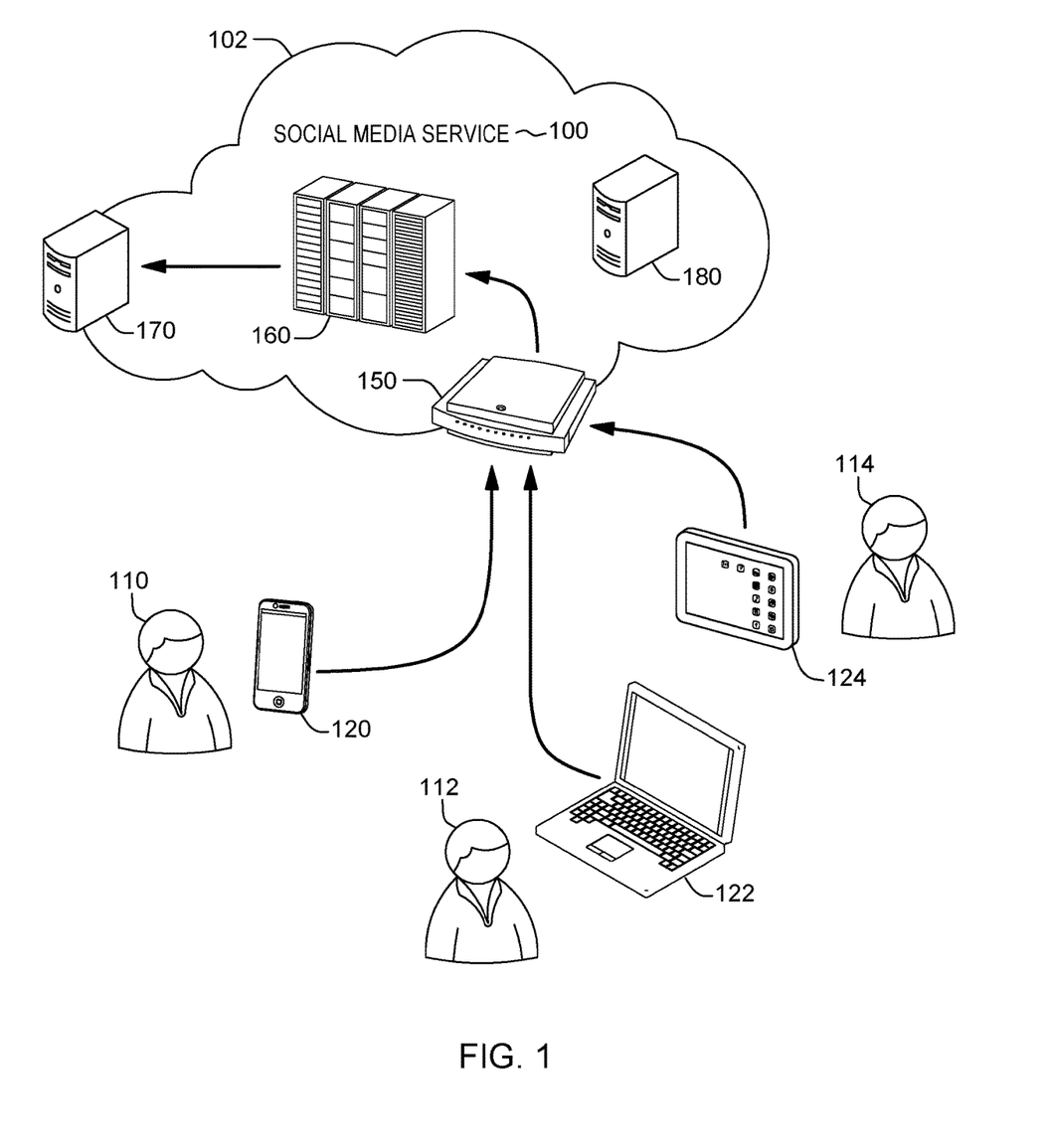
FIG. 1 illustrates a social network system in accordance with an embodiment of the present invention.

Embodiments of the invention generally relate to social media and digital communications between various parties and users. FIG. 1 illustrates some of the components in modern Internet based social media. Social Media Service 100 is an Internet based service, and users access the service and communicate with other users via the Internet 102.

Social Media Services 100 comprises equipment such as edge device 150 (which can be a router or server with load-balancing features), an application server 160 (which performs the heavy data processing required by large scale systems), and web server 170 (which provides the public with access to data hosted on the social media sites. FIG. 1 shows a group of users 110, 112 and 114 that access the Service 100 via client devices 120, 122 and 124.

FIG. 1 also shows a social network analyzer server 180 that analyzes communications between users of the Social Media Service. Analyzer 180 is configured to assist users to interact in social networking groups, as discussed in further detail below. Analyzer server 180 may be part of Social Media Service 100 or may be separate from that Service and provide a service separate from or in addition to the services provided by Service 100.

One of ordinary skill in the art will recognize that the word "server" is not limited to a single server box or computer, and can refer to a distributed system with numerous computer components and instances.

Figure 2:
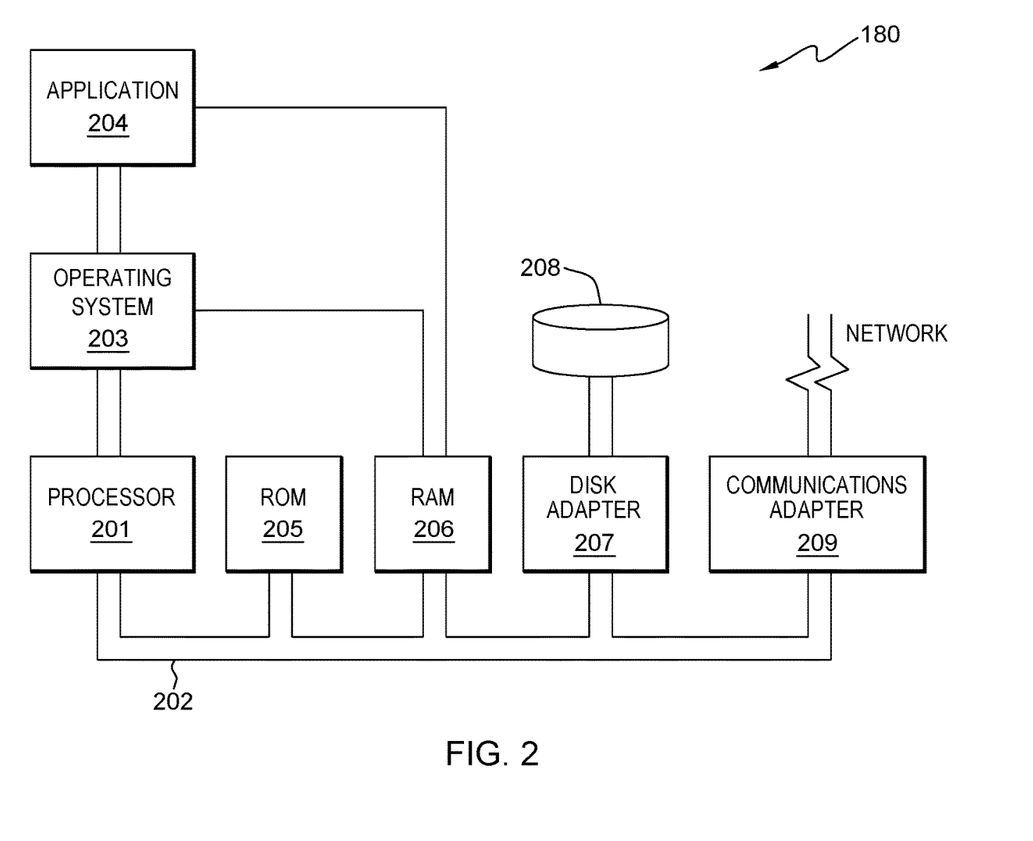
FIG. 2 depicts a hardware configuration of a social network analyzer in accordance with an embodiment of the invention.

FIG. 2 illustrates a hardware configuration of a social network analyzer 180 (FIG. 1) which is representative of a hardware environment for practicing the present invention. Social network analyzer 180 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for assisting users to interact in social networking groups, as discussed further below.

In the architecture of FIG. 2, read-only memory ("ROM") 205 is coupled to system bus 202 and includes a basic input/output system ("BIOS") that controls certain basic functions of social network analyzer 104. Random access memory ("RAM") 206 and disk adapter 207 are also coupled to system bus 202. It should be noted that software components including operating system 203 and application 204 may be loaded into RAM 206, which may be social network analyzer's 104 main memory for execution. Disk adapter 207 may be an integrated drive electronics ("IDE") adapter that communicates with a disk unit 208, e.g., disk drive. It is noted that the program for assisting users to interact in social networking groups, may reside in disk unit 208 or in application 204.

Social network analyzer 180 may further include a communications adapter 209 coupled to bus 202. Communications adapter 209 interconnects bus 202 with an outside network (network 102) thereby allowing social network analyzer 180 to communicate with client devices as well as to scan and parse content posts made by users of the client devices.

With reference to FIG. 1, user 110 accesses the social media site via smart phone 120, user 112 accesses the social media site via laptop computer 122, and user 114 accesses the social media site via tablet computer 124. Generally, when users want to share data on the social media site, they upload text, photographs, multimedia, or other data through edge device 150, which forwards the data to an appropriate application server 160, which, after processing the data, makes the data available to the public, or a certain subset of the public, via web server 170.

Figure 3:
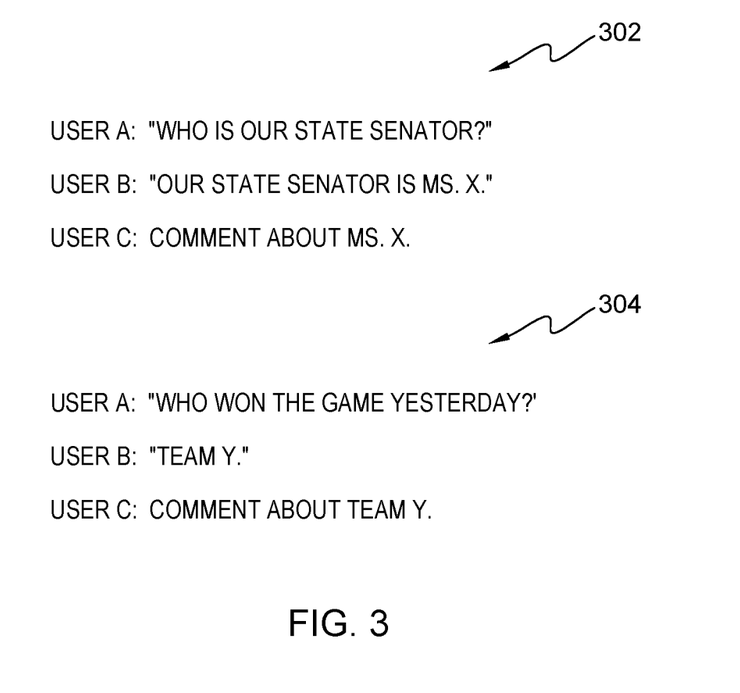
FIG. 3 shows examples of message threads on social media

FIG. 3 illustrates message threads that may arise during the use of social media. In the thread shown at 302, user A starts a conversation by asking "Who is our state senator?" User B responds by saying "Our state senator is Ms. X," and user C makes a comment about Ms. X. In the thread shown at 304, user A starts by asking "Who won the game yesterday?" User B responds by saying "Team Y," and user C makes a comment about Team Y.

As mentioned above, online conversations, forums, blogs and other outlets can quickly and easily become overheated with inflammatory comments on any particular given topic within the digital realm. People may read particular digital content and instinctively respond with an accelerated reaction, which they may later regret. Embodiments of the invention pre-identify the origin of the mental anguish of the posting user and prevent the user from immediately posting a response that the user might later regret.

Figure 4:
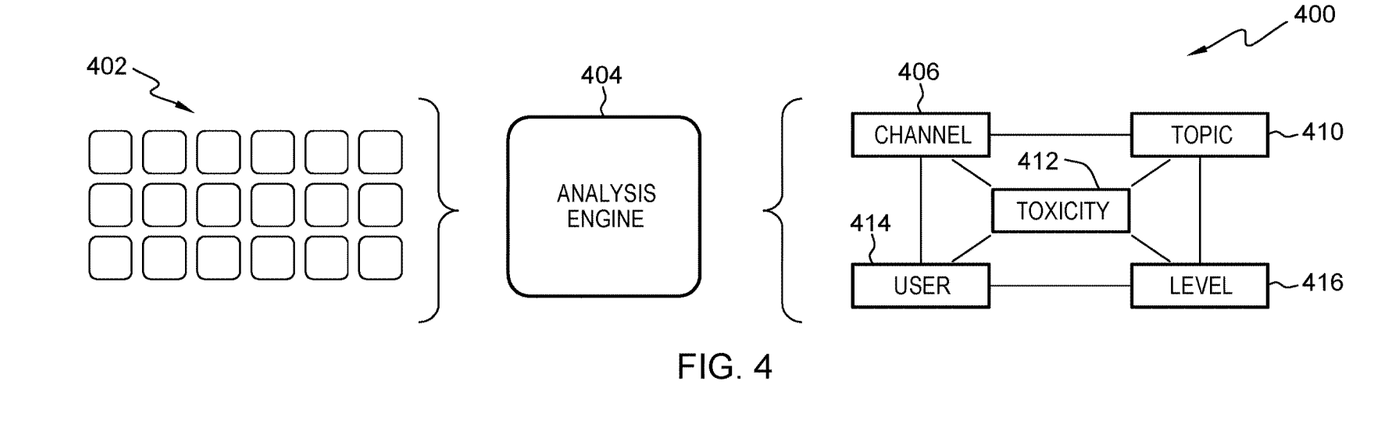
FIG. 4 depicts a workflow for an embodiment of the invention.

FIG. 4 illustrates a workflow 400 for embodiments of the invention. In this workflow, messages from social media 402 are analyzed by analysis engine 404. The analysis engine identifies channels 406 and topics 410. The analysis engine also analyzes the messages for toxicity 412, or content that may be inflammatory to a user 414, and for a level 416 of that toxicity.

Embodiments of the invention identify potentially negative trending threads within social media outlets. Once the social media threads are identified, the invention, in embodiments, selectively categorizes potentially inflammatory digital content to the user. The system, in embodiments, spots the inflammatory nature, or toxicity, within a thread and provides a time-based shielding for the user to prevent the user from posting possible negative comments. Embodiments of the invention promote emotive neutrality to the best means possible, without removing the ability of free speech within the thread.

Generally, in embodiments of the invention, social groups and fora/channel messages are analyzed for topic and emotive sentiment/content analysis, a Latent class model is derived to determine the type and level of inflammatory subject matter, or toxicity, in forum threads, and a Principle Component Analysis model is derived to determine the factors that contribute to fora thread toxicity. Both models can be used in conjunction to determine threads with trending levels of inflammatory subject matter, or toxicity, and remedial action can be taken when these thread reach a particular criteria (i.e., users will be unable to post to a thread for a specified duration).

These features are discussed in more detail below.

In an embodiment, the invention provides a method in which social groups and fora channel messages are analyzed for topic and emotive analysis. In this method, social media channels and fora are grouped by topic, the applicable data and topics are sorted, and the data are filtered to prepare for a toxicity vetting process. These steps may utilize any suitable Tradeoff Analytics.

In embodiments of the invention, a latent class model is used to determine the type and level of inflammatory content in forum threads. A latent class model relates a set of observed multivariate variables to a set of latent variables.

A Latent Class Model is established based on the following criteria:
  Latent Class Model (LCM) definition:
  Objective: Defining Thread Toxicity;
  The Class model will describe the static structure of the classes within the system;
  Comments are mapped to threads within specific topics;
  Attributes: Level of Toxicity will be generated from =Topic, Channel, User, Level.

Using the velocity of posts, the level of emotion within a thread can be monitored. Through a broader analysis of a large amount of threads, a higher than normal emotive influence can be detected through creating a dynamic Principle Component Analysis approach.

Principle Component Analysis (PCA) is a statistical procedure that uses an orthogonal transformation to convert a set of observations of possible correlated variables into a set of values of linearly uncorrelated variables called principle components.

In embodiments of the invention, Principle Component Analysis comprises enumerating specific factors which embody a thread (author ID, emotive content topic count etc). Using PCA analysis, the factors are determined which contribute most to inflammatory subject matter (using the level of variance as a guide); and with these factors known, the model can be fine tuned to these factors.

In embodiments of the invention, the System selects the top x % of threads of a larger sample size (example: 1000 threads analyzed, selecting the top 1% pick would yield the top 10 emotive threads). Utilizing a deep Learning approach via a Natural Language Classifier (NLC), the emotive content per thread can be determined. This becomes the key inflammatory content, or toxicity, indicator trigger to be set within the NLC. Any suitable NLC can be used in embodiments of the invention, and a number of such NLCs are known in the art.

An iterative analysis can be utilized on the key identified areas enclosed, and further analysis over time will reveal trending toxicity within threads. The requested outcome answers the question: How likely is a thread to be Toxic and is toxicity changing? The outcome is archived, and the thread can be compared to the larger sample group via principle component analysis to find the current toxicity and to determine trending toxicity over a period of time.

Figure 5:
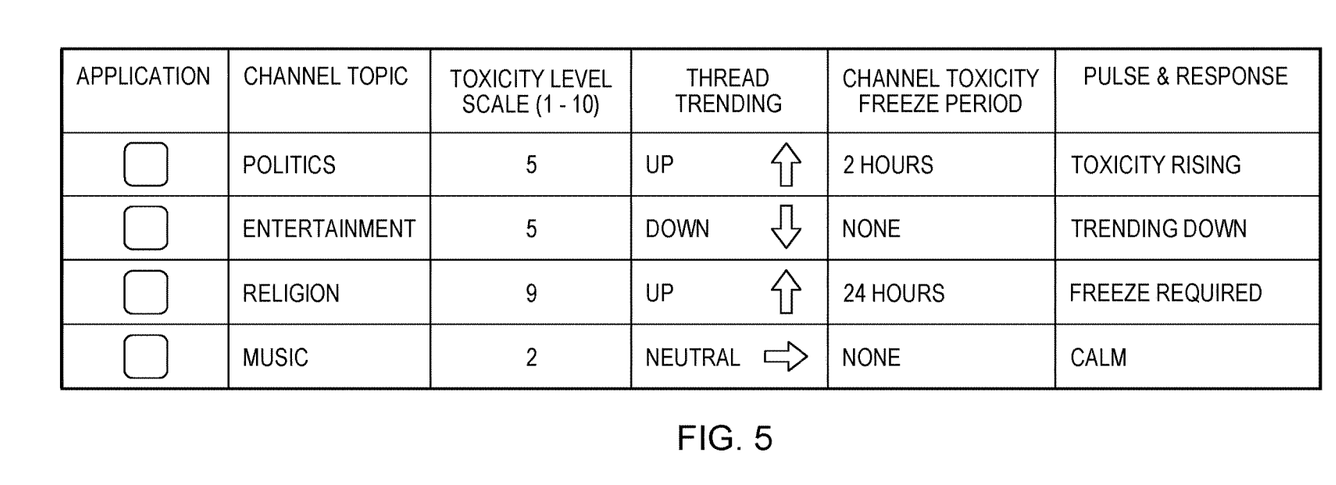
FIG. 5 shows a table including data relating to several message threads.

In embodiments of the invention, the latent class model is used to provide a toxicity summary of a forum thread. FIG. 5 is a table that shows scoring of toxicity. Within the Latent Class Model (LCM), the Multivariate mixture estimation (MME) is used to determine the probability of a behavior happening within the hierarchy of the class. Per the output from the Natural Language Classifier (NLC), a score value can be determined as explained below.

Toxicity Threading Detection—(Scoring):
  Score (0 0.33) Low: No Toxicity existing, monitoring continues with no interaction;
  Score (0.34-0.66) Medium: Some Toxicity exists and the forum(s) or channel(s) are marked for close observation and Actions;
  Score (0.67-1.0) High: High levels of toxicity are found to exist and actions are taken to alter the thread appropriately.

In embodiments of the invention, threads with trending levels of toxicity will have a "posting freeze period" employed. (i.e., users will be unable to post to the thread for an amount of time such as a number of hours, days etc). For the channels that have reached a freeze action, the table of FIG. 5 gives an example of how the action would be implemented for the specific channel. As an example, once the toxicity scoring has reached a level of 0.7 or higher, the freeze period would be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method for assisting users to interact with message threads on social media, the method comprising:
    monitoring, using one or more processors, a message thread comprised of a plurality of messages among a group of users on a social media platform for content that is inflammatory, based on defined criteria, to one of the users, the monitoring a message thread on social media platform for content that is inflammatory comprising:
    analyzing, using the one or more processors, groups of messages on social media sites for topic and emotive sentiment, said analyzing including utilizing a natural language classifier to derive an emotive content of the message thread; and
    when the inflammatory content has a defined condition, preventing, using one or more processors, said one of the users from posting messages to the message thread for a specified length of time, the preventing comprising: responding to an indicator trigger set within the natural language classifier based upon the derived emotive content,
    wherein the monitoring a message thread on social media platform for content that is inflammatory further comprises:
    using the topic and emotive sentiment to provide a summary of inflammatory content in the message thread, the using the topics and emotive sentiment to provide a summary of inflammatory content in the message thread further comprising:
    deriving a latent class model to determine types and levels of inflammatory content in the groups of messages on the social media sites, the determining, by the one or more processors, within the latent class model, types and levels of inflammatory content in the groups, further comprising:
    using, by the one or more processor, a multivariate mixture estimation (MME) to determine a probability of a behavior occurring within a hierarchy of the class based on an output score value of the natural language classifier.

2. The method according to claim 1, wherein the defined condition of the inflammatory content is a defined level of the inflammatory content in the message thread.

3. The method according to claim 1, wherein the defined condition of the inflammatory content is a defined increasing trend of the inflammatory content in the message thread.

4. The method according to claim 1, wherein the monitoring a message thread on a social media platform includes:
    categorizing potentially inflammatory content to the one user into a plurality of categories; and
    for each of the categories, specifying an inflammatory content level.

5. The method according to claim 4, wherein the monitoring a message thread on a social media platform further includes:
    for each of the categories, specifying a channel freeze period.

6. The method according to claim 1, wherein the using the topic and emotive sentiment to provide a summary of inflammatory content in the message thread includes:
    grouping channels and forums of the social media by topic;
    sorting the topics and data from the channels and forums; and
    filtering the data to prepare for an inflammatory content vetting process.

7. The method according to claim 1, wherein the monitoring a message thread on a social media platform includes:
    using a velocity of postings of messages in the message thread to monitor a level of emotion within the message thread.

8. A computer system for assisting users to interact with message threads on social media, the computer system comprising:
    a memory for storing data;
    one or more processing units connected to the memory for sending data to and receiving data from the memory, said one or more processing units being configured for:
    monitoring a message thread comprised of a plurality of messages among a group of users on a social media platform for content that is inflammatory, based on defined criteria, to one of the users, the monitoring a message thread on social media platform for content that is inflammatory comprising:
    analyzing, using the one or more processors, groups of messages on social media sites for topic and emotive sentiment, said analyzing including utilizing a natural language classifier to derive an emotive content of the message thread; and
    when the inflammatory content has a defined condition, preventing said one of the users from posting messages to the message thread for a specified length of time, the preventing comprising: responding to an indicator trigger set within the natural language classifier based upon the derived emotive content,
    wherein the monitoring a message thread on social media platform for content that is inflammatory further comprises:
    using the topic and emotive sentiment to provide a summary of inflammatory content in the message thread, the using the topics and emotive sentiment to provide a summary of inflammatory content in the message thread further comprising:
    deriving a latent class model to determine types and levels of inflammatory content in the groups of messages on the social media sites, the determining, by the one or more processors, within the latent class model, types and levels of inflammatory content in the groups, further comprising:
    using, by the one or more processor, a multivariate mixture estimation (MME) to determine a probability of a behavior occurring within a hierarchy of the class based on an output score value of the natural language classifier.

9. The computer system according to claim 8, wherein the defined condition of the inflammatory content is a defined level of the inflammatory content in the message thread.

10. The computer system according to claim 8, wherein the defined condition of the inflammatory content is a defined increasing trend of the inflammatory content in the message thread.

11. The computer system according to claim 8, wherein the monitoring a message thread on a social media platform includes:
- categorizing potentially inflammatory content to the one user into a plurality of categories; and
- for each of the categories, specifying an inflammatory content level, and specifying a channel freeze period.

12. The computer system according to claim 8, wherein the monitoring a message thread on a social media platform includes:
- using a velocity of postings of messages in the message thread to monitor a level of emotion within the message thread.

13. A computer readable program storage device comprising:
- a computer readable storage medium having program instructions embodied therein for assisting users to interact with message threads on social media, the program instructions executable by a computer to cause the computer to perform the method of:
  - monitoring a message thread comprised of a plurality of messages among a group of users on a social media platform for content that is inflammatory, based on defined criteria, to one of the users, the monitoring a message thread on social media platform for content that is inflammatory comprising:
  - analyzing, using the one or more processors, groups of messages on social media sites for topic and emotive sentiment, said analyzing including utilizing a natural language classifier to derive an emotive content of the message thread; and
  - when the inflammatory content has a defined condition, preventing said one of the users from posting messages to the message thread for a specified length of time, the preventing comprising: responding to an indicator trigger set within the natural language classifier based upon the derived emotive content,
  - wherein the monitoring a message thread on social media platform for content that is inflammatory further comprises:
    - using the topic and emotive sentiment to provide a summary of inflammatory content in the message thread, the using the topics and emotive sentiment to provide a summary of inflammatory content in the message thread further comprising:
    - deriving a latent class model to determine types and levels of inflammatory content in the groups of messages on the social media sites, the determining, by the one or more processors, within the latent class model, types and levels of inflammatory content in the groups, further comprising:
    - using, by the one or more processor, a multivariate mixture estimation (MME) to determine a probability of a behavior occurring within a hierarchy of the class based on an output score value of the natural language classifier.

14. The computer readable program storage device according to claim 13, wherein the defined condition of the inflammatory content is a defined level of the inflammatory content in the message thread.

15. The computer readable program storage device according to claim 13, wherein the defined condition of the inflammatory content is a defined increasing trend of the inflammatory content in the message thread.

16. The computer readable program storage device according to claim 13, wherein the monitoring a message thread on a social media platform includes:
- categorizing potentially inflammatory content to the one user into a plurality of categories; and
- for each of the categories, specifying an inflammatory content level, and specifying a channel freeze period.

17. The computer readable program storage device according to claim 13, wherein the monitoring a message thread on a social media platform includes:
- using a velocity of postings of messages in the message thread to monitor a level of emotion within the message thread.

\* \* \* \* \*